May 8, 1934.  L. H. HYATT  1,957,962
LIQUID DISPENSER
Filed July 19, 1933   2 Sheets-Sheet 1
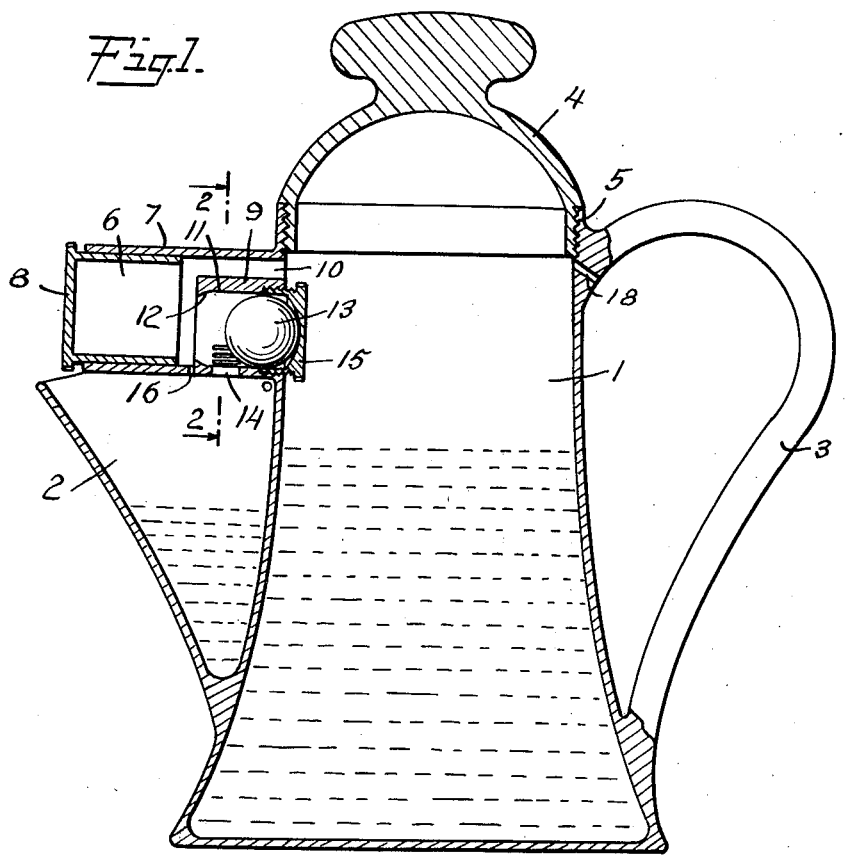
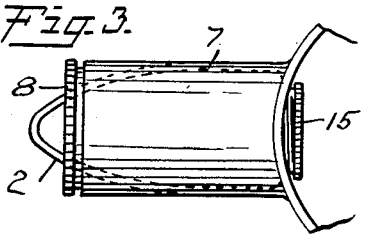
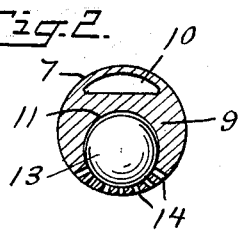
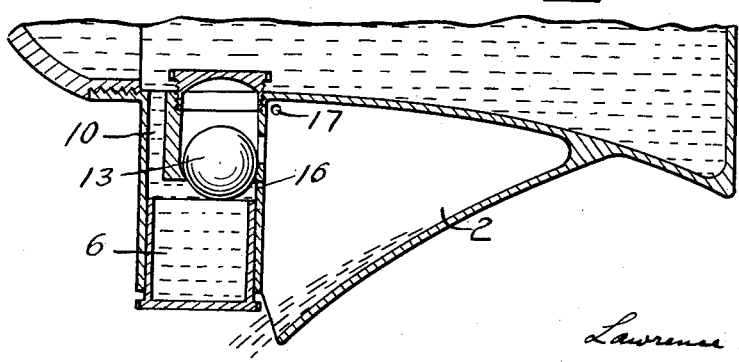
INVENTOR
Lawrence H. Hyatt
BY
Pennie, Davis, Marvin & Edmonds
his ATTORNEYS May 8, 1934.  L. H. HYATT  1,957,962
LIQUID DISPENSER
Filed July 19, 1933  2 Sheets-Sheet 2
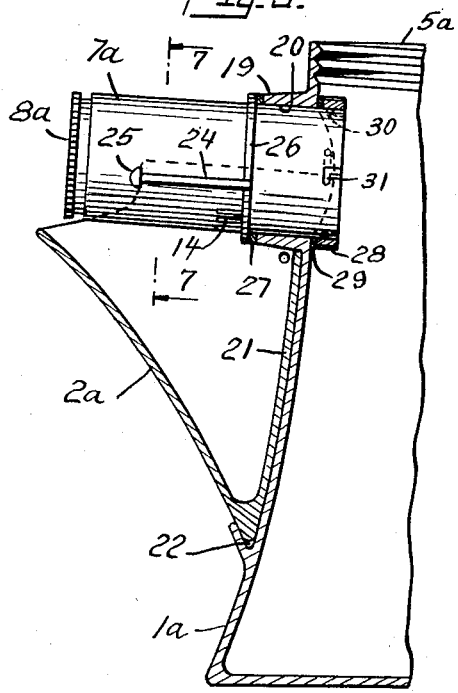
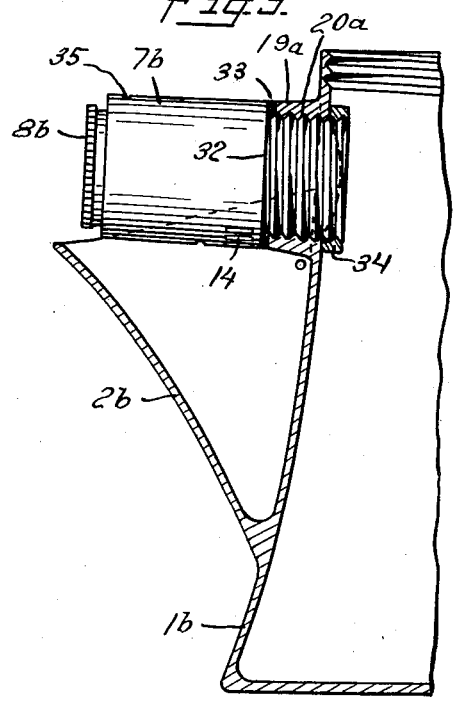
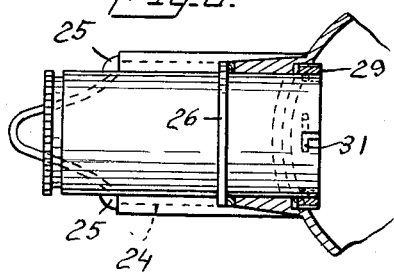
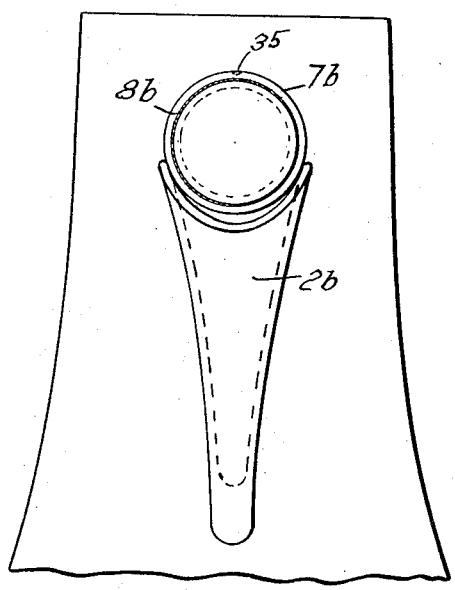
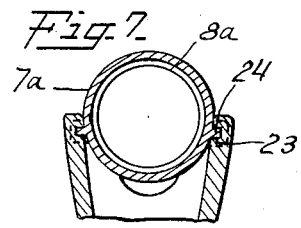
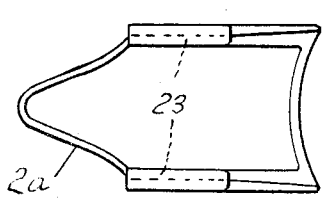
INVENTOR
Lawrence H. Hyatt
BY
Pennie, Davis, Marvin & Edwards
his ATTORNEYS Patented May 8, 1934

1,957,962

UNITED STATES PATENT OFFICE 1,957,962

LIQUID DISPENSER

Lawrence H. Hyatt, Brooklyn, N. Y.

Application July 19, 1933, Serial No. 681,060

11 Claims. (Cl. 221—98)

This invention relates to liquid dispensers of the sort adapted to discharge the liquid contained in them in measured quantities. Such dispensers are employed for example in restaurants, soda fountains, lunch counters, etc. for measuring the correct amount of cream for coffee, the desired amount of syrup or other liquid used in mixing fountain drinks, and for other purposes where it is desired to quickly and repeatedly measure out into a receptacle a definite quantity of liquid.

My present invention relates more particularly to the provision of a container for cream to be used in restaurants, lunch rooms and other eating places for measuring the cream to be used in coffee, although if desired, it may be applied to other uses as just mentioned. The invention is particularly useful in those eating places where the cream is placed directly in the coffee cup before the coffee is served to the customer, that is, the cream may be poured directly into the cup from my improved dispensing vessel either just before or just after the coffee is drawn into the cup from the coffee making machine. The device may also be used where the cream is served to the customer separately, in which case it insures that an exact predetermined amount of cream is poured into the individual receptacles used for the purpose.

With the cream dispensers which are now in ordinary use and which provide for the measuring of the quantity of cream served with each cup of coffee, the cream is usually discharged by gravity from a valve mechanism at the bottom of the dispensing vessel so that the valve is always under the pressure of the liquid in the vessel and a substantial amount of leakage takes place. This leakage is in some cases quite noticeable and the dripping of the cream on the table or counter is most objectionable for reasons of sanitation and cleanliness. In some cases drainage trays connected with the sewerage system of the building are provided, but this involves a considerable expense. In any event, that is to say whether the amount of leakage is or is not sufficient to create an untidy condition, it is sufficient to cause a very substantial loss of cream inasmuch as this leakage is constant, continuing usually throughout the entire twenty-four hours of each day.

In all the devices of which applicant is aware which are not subject to the above difficulties, the construction of the measuring vessel is sufficiently intricate to render it extremely difficult to clean, and obviously this is a prime consideration in a device of this kind.

As a result of the difficulties mentioned, dispensing vessels for cream have not come into any very general use, and in order to obtain some uniformity in the amount of cream served with coffee, the use of individual cream receptacles has become general. These are objectionable, however, both because of the large amount of work entailed in washing, as well as on account of their cost, and also because of the fact that the flavor of a cup of coffee is improved if the cream is placed in the cup and the hot coffee drawn onto the cream, rather than drawing the coffee first and pouring the cream into the coffee.

The principal object of the present invention, therefore, is to provide a dispensing vessel for cream which is so constructed that it is impossible for leakage and wastage to occur, and the parts of which are arranged in such manner that it can be readily cleaned.

Another object of the invention is to provide such a device in which the parts of the measuring mechanism can be disassembled without difficulty, and when taken apart the mechanism can be cleaned by simply directing a stream of hot water through the mechanism.

A further object of the invention is to provide a device of this sort in which the quantity of liquid measured can be quickly and accurately varied or adjusted as desired.

The invention will be understood from a consideration of the accompanying drawings illustrating by way of example several embodiments thereof.

In these drawings:

Fig. 1 represents a view in central vertical section of a cream dispenser constructed in accordance with my invention.

Fig. 2 is a vertical section taken on line 2—2 of Fig. 1 through the measuring mechanism.

Fig. 3 is a top plan view of the measuring mechanism and pouring spout or compartment and showing a fragment of the liquid container.

Fig. 4 is a view similar to Fig. 1 of the front portion only of the dispensing vessel showing the position of the parts when in pouring position.

Fig. 5 is a view similar to Fig. 1 of the front portion of a dispensing vessel showing a modified construction.

Fig. 6 is a plan view of Fig. 5 with a part thereof shown in horizontal section taken centrally of the measuring mechanism.

Fig. 7 is a vertical section taken on line 7—7 of Fig. 5 through the measuring mechanism.

Fig. 8 is a plan view of the pouring spout shown in Fig. 5 separated from the other parts of the device.

Fig. 9 is a view similar to Fig. 1 of the front portion of another modification of the cream dispenser, with the measuring chamber shown in side elevation; and Fig. 10 is a view in front elevation looking directly toward the spout of the measuring vessel shown in either Fig. 1 or Fig. 9.

Referring now to these drawings, one form of my improved liquid dispensing vessel is illustrated in Fig. 1, the vessel being shaped somewhat like a small pitcher, the interior of which forms a liquid containing compartment 1 and which is provided with a spout-shaped pouring compartment 2, a handle 3 and a cover 4. The cover is in some convenient way secured tightly in place so that it will not fall off or loosen so as to allow liquid from within the vessel to escape when the vessel is tipped so as to pour liquid from the pouring compartment. As shown, the cover 4 is held in place by the threads 5.

The pouring compartment 2 is not in direct communication with the liquid containing compartment 1, so that when the vessel is tipped to pouring position, only that liquid which is held in the pouring compartment will be delivered from the spout into the coffee cup or other receptacle. Above the pouring compartment 2, so that the liquid will flow by gravity from one compartment to the other, is a measuring compartment 6, formed as shown in Figs. 1, 3 and 4 in the shape of a tubular member 7 which projects outwardly from the side wall of the vessel on the opposite side from handle 3 and near the top just beneath the cover 4. This compartment is preferably provided with a cap 8 which telescopes with a snug sliding fit within the outer end of the tubular member 7 and affords a means by which the size of the measuring compartment 6 can be readily adjusted as desired.

Toward the inner end of the measuring compartment 6 is a valve chamber 9 which is positioned in the lower portion of the measuring chamber 6 leaving above the same a passage 10 by means of which the liquid from compartment 1 can pass to the measuring compartment 6 when the vessel is tipped to pouring position as will be understood from Fig. 4. Valve chamber 9 is preferably formed integrally with the walls of tubular member 7 as may be seen from the cross sectional view shown in Fig. 2. The interior of the valve chamber 9 has a longitudinal bore 11 extending parallel with the axis of tubular member 7 and provided at its inner end with a valve seat 12 and a ball valve 13. The lower side wall of tubular member 7 is pierced with a plurality of longitudinal slots 14 forming an outlet for the cream or other liquid from the measuring chamber 6 into the pouring chamber 2 when the ball valve 13 is in the position shown in Fig. 1.

This is the normal position of the valve 13 when the dispensing vessel is standing upright because of the fact that the lower surface of bore 11 has a slope sufficient to cause the ball valve 13 to roll inwardly away from the valve seat 12 and against the cap 15 which is threaded into the inner end of valve chamber 9 from the liquid containing compartment 1. This slope is most readily provided by arranging the entire tubular member 7 at a slight angle to the horizontal as shown in the drawings. The cap 15 is deeply recessed to permit of ample inward movement of ball valve 13 away from seat 12 and outlet 14 without causing the forward end of valve chamber 9 to extend an inordinate distance into the measuring chamber 6.

In operation, assuming that there is a quantity of cream in the pouring chamber 2, when the vessel is tipped forward somewhat as shown in Fig. 4, to pour this liquid into a coffee cup or other receptacle, the liquid from compartment 1 simultaneously enters and fills the measuring compartment 6 through the passageway 10. Ball valve 13 descends against the valve seat 12 and prevents the escape of the cream through the outlet 14 and the pouring spout or chamber 2. In order to allow the measuring compartment 6 to fill quickly, a capillary passageway 16 may be provided in the wall of the measuring chamber to serve as a vent to allow the escape of air. This vent is of such small size that with the small liquid pressure head existing, it is substantially impossible to produce a flow of liquid through the vent. In any event, the amount of liquid passing through it during the short time that the vessel is tipped to pouring position is negligible.

As shown in Figs. 1 to 4 inclusive, the spout 2 and tubular member 7 are formed integrally with the body of the dispensing vessel, and the top of pouring chamber 2 is tightly closed by tubular member 7. In order, therefore, to allow the cream to flow freely from the pouring chamber 2, an aperture 17 is placed in one side of the pouring chamber near the front wall of the liquid compartment 1 so that air may pass into the pouring chamber freely as the liquid flows out.

When the vessel is returned to upright position, ball valve 13 immediately runs back against cap 15 thereby allowing the cream in measuring chamber 6 to flow through the interior of the valve chamber and outlet slots 14 and into pouring chamber 2 thereby providing a charge within this chamber ready for the next pouring operation. When the liquid-containing compartment 1 is comparatively full of liquid it is desirable, in order to provide for a free and rapid flow of the cream into the measuring compartment 6, to arrange for the admission of air to compartment 1 above the cream therein. This is taken care of by means of a vent 18 which may conveniently be placed at the point where the upper end of the handle 3 joins the side wall of the vessel.

My improved liquid-dispensing vessel may be made of any suitable material or combination of materials. I prefer, however, to construct it of an impervious molded composition such for example as bakelite, the ball valve member being made of glass. In order to render the pouring compartment as well as the measuring compartment readily accessible for cleaning and to facilitate molding, the vessel is made in two or more separate sections or parts as illustrated in Figs. 5–10 of the drawings. As shown in Figs. 5–8 inclusive, both the spout or pouring compartment 2a and the tubular member 7a are made separate from the liquid-containing compartment 1a, that is, the body of the dispensing vessel. In Figs. 9 and 10, only the measuring compartment and valve chamber are separable from the container.

The main body of the vessel which constitutes the liquid-containing compartment 1a is formed with a boss 19 near the top, close to the threaded portion 5a by which the cover is held in place. Through this boss, there extends a circular opening 20 within which the tubular member 7a is removably mounted in a manner which will presently be described. The pouring compartment 2a is preferably of spout-shaped formation similar to compartment 2 but is provided with a rear wall 21 separate from the wall of the liquid-containing compartment 1a. The lower pointed end of pouring compartment 2a is received within a small socket 22 formed on the side of the container. The upper side walls of pouring compartment 2a are grooved as shown at 23, and the opposite sides of tubular member 7a are provided with beads or tongues 24 adapted to coact with grooves 23 and secure the pouring compartment 2a to tubular member 7a. With these two parts both removed from the container they can be readily assembled or disassembled by sliding the front end of grooves 23 over the rear or inner end of tongues 24 until the front end of the grooves engages a stop 25 which is formed on tubular member 7a at the front ends of the tongues.

In order to removably position the tubular member 7a within the opening 20, a shoulder 26 is provided on the exterior of the tubular member which is adapted to engage the outer end of boss 19, a gasket 27 of rubber or other suitable material being inserted if desired. The inner end of tubular member 7a extends a sufficient distance into liquid-containing compartment 1a to accommodate a narrow circular holding ring 28 of bakelite or other suitable material, and if desired, a thin washer 29, both of which are slipped over the end of tubular member 7a. Holding ring 28 is provided on its inner surface with four inwardly projecting pins 30 which are adapted to be received within bayonet slots 31 formed in the walls of tubular member 7a close to its inner end. The outer surface of the holding ring 28 is preferably roughened or knurled so that it can be easily grasped with the fingers and manipulated through the open top of the container to either engage or disengage the pins 30 from the bayonet slots 31.

It will be understood that tubular member 7a corresponds with tubular member 7 of Fig. 1 and aside from the details of construction just referred to, is made in a similar way. That is to say, it constitutes a measuring chamber for supplying charges of cream through the outlet 14 to the pouring compartment 2a.

In assembling the pouring compartment 2a and tubular member 7a with the container, the lower tip of the pouring compartment is first inserted in socket 22 and the compartment is held by the fingers in position against the side of the container as shown in Fig. 5. Then the tongues 24 on the sides of tubular member 7a are inserted in slots 23 and the tubular member is pushed inwardly, that is, to the right as viewed in Fig. 4, until its inner end passes through opening 20 and shoulder 26 engages the outer end of boss 19. Then the holding ring 28 is put in position as previously described. In order to take the device apart for cleaning, the reverse order is followed.

Referring now to Fig. 9, in the modified construction here shown, the pouring compartment 2b is made integral with the container 1b as in the case of the form shown in Fig. 1, but the tubular member 7b is removable from the container. It will be understood that, as before, tubular member 7b contains the measuring compartment and ball valve for controlling the flow of measured quantities of liquid to the pouring compartment 2b through the outlet 14.

In this form of construction the container 1b is provided with a boss 19a which is similar to boss 19 except that the aperture therethrough, 20a, is threaded. The tubular member 7b is reduced in diameter at its inner end and threaded correspondingly with the opening 20a so that it may be screw into this opening causing the shoulder 32 to engage and suitably compress washer 33 placed between this shoulder and the end of boss 19a. This secures the measuring chamber firmly in position on the container in such a manner that it can be readily removed for cleaning purposes.

The outlet 14 on tubular member 7b may be brought to the lower side within the pouring compartment 2b by selecting a washer 33 of appropriate thickness or by making washer 33 of considerable thickness and resiliency so that the washer can be compressed under the turning of tubular member 7b until the outlet 14 is in the proper position. If desired, the inner threaded end of tubular member 7b may be of sufficient length to extend into liquid-containing compartment 1b and receive a knurled lock nut 34. An index mark, such for example, as the slight depression indicated at 35, may, if desired, be placed upon tubular member 7b to indicate when the discharge outlet 14 is in proper position.

By means of my improved liquid-dispensing container there has been provided a device by means of which the cream used in serving coffee at eating places may be measured in ample but equal amounts to each customer and entirely without wastage. Also the untidy effect caused by dripping and wastage of cream from the ordinary cream dispensers now in use is eliminated. If desired, a scale indicating the capacity of the measuring compartment when the cap 8 is in different positions may be placed upon the outer cylindrical surface of this cap.

In addition to providing a device which is convenient to use and which prevents wastage, the improved dispenser is readily cleanable since the parts are so arranged that they can all be cleaned by means of a direct stream of hot water. Thus, for example, in cleaning the device of Fig. 1, the cap 8 would be removed, the cover 4 and the cap 15. The removal of this latter cap releases the ball valve 13, and a stream of hot water can now be directed straight through the entire measuring compartment and valve chamber, there being no hidden recesses which cannot be reached directly by such a stream. The pouring compartment 2 can be cleaned by directing a stream of hot water into the opening directly beneath the outer end of tubular member 7.

The modified forms of the invention shown in Figs. 9 and 5 are even more readily cleanable than the form of the invention shown in Fig. 1, inasmuch as the tubular member 7b and 7a can be completely removed from the container and from the pouring compartments 2b and 2a. This gives an opportunity either to pass streams of hot water directly through the measuring compartment and valve chamber or to immerse them in boiling water. Moreover, free access is obtainable to the pouring compartments 2b and 2a. These constructions are arranged also in such a way that they have few parts and these parts may be easily taken apart and put together.

It is to be understood that the above is an exemplifying disclosure and that changes may be made in the construction within the terms of the appended claims without departing from the spirit of the invention.

I claim:

1. In a liquid dispensing container, the combination of a liquid-containing compartment, a pouring compartment, a measuring compartment disposed above said pouring compartment, a valve chamber separating said measuring compartment from said liquid-containing compartment, a passageway above said valve chamber for the introduction of liquid from said liquid containing compartment to said measuring compartment when the device is tipped to pour liquid from said pouring compartment, said valve chamber having a passageway therethrough provided with an inlet from said measuring compartment and an outlet to said pouring compartment, and a valve within said chamber adapted to close said passageway when the vessel is tipped to pouring position and to open said passageway when the vessel is returned to upright position.

2. In a liquid dispensing container, the combination of a liquid-containing compartment, a pouring compartment, a tubular member disposed substantially horizontally above said pouring compartment in communication at its inner end with said liquid containing compartment, a removable closure for the outer end of said tubular member thereby forming in said member a measuring compartment, a valve chamber within the lower portion of said tubular member at its inner end having a passageway therethrough provided with an inlet from said measuring compartment and an outlet to said pouring compartment, and a valve within said chamber adapted to close said passageway when the vessel is tipped to pour liquid from said pouring compartment and to open said passageway when the vessel is returned to upright position.

3. In a liquid dispensing container having a liquid-containing compartment and a pouring compartment, a measuring compartment comprising a substantially horizontal tubular member having a measuring compartment at one end and a valve chamber at the opposite end said valve chamber having a channel extending longitudinally with respect to said tubular member, a valve seat in the end of said channel adjacent said measuring chamber, a valve member within said chamber, an outlet at the side of said valve chamber communicating with said pouring compartment, a removable valve retaining cap in the end of said valve chamber, and a removable closure for said measuring compartment at the opposite end of said tubular member.

4. In a liquid dispensing container having a liquid-containing compartment and a pouring compartment, a measuring compartment comprising a substantially horizontal tubular member having a measuring chamber at one end and a valve chamber at the opposite end, said valve chamber having a channel extending longitudinally with respect to said tubular member, a valve seat in the end of said channel adjacent said measuring chamber, a valve member within said chamber, an outlet at the side of said valve chamber communicating with said pouring compartment, a removable valve retaining cap in the end of said valve chamber, and a removable closure for said measuring compartment comprising a cap having a cylindrical skirt portion telescoping within the outer end of said tubular member and adjustable therein to vary the size of said measuring compartment.

5. In a liquid dispensing container, the combination of a liquid-containing compartment, a pouring compartment, a measuring compartment disposed above said pouring compartment, a valve chamber separating said measuring compartment from said liquid-containing compartment, a passageway above said valve chamber for the introduction of liquid from said liquid-containing compartment to said measuring compartment when the device is tipped to pour liquid from said pouring compartment, said valve chamber having a passageway therethrough provided with an inlet from said measuring compartment and an outlet to said pouring compartment, and a valve within said chamber adapted to close said passageway when the vessel is tipped to pouring position and to open said passageway when the vessel is returned to upright position, said measuring compartment having a capillary passageway communicating with said pouring compartment adjacent said valve chamber.

6. In a liquid dispensing container having an aperture in the upper portion of the side wall thereof, a substantially horizontal tubular member having one end thereof removably mounted in said aperture, said tubular member having therein a measuring compartment, a pouring compartment arranged to receive liquid from said measuring compartment, and a gravity operated valve mechanism for permitting flow of liquid between said compartments when the container is in the upright position and preventing said flow when the container is tipped to pouring position.

7. In a liquid dispensing container having an aperture in the upper portion of the side wall thereof, a tubular member open at both ends and having one end removably mounted within said aperture, a removable cap for the outer end of said tubular member forming adjacent thereto a measuring compartment, a valve chamber partially closing the lower portion of the inner end of said tubular member, a pouring compartment arranged to receive liquid from said measuring compartment, a gravity operated valve mechanism in said valve chamber adapted to permit flow of liquid from said measuring compartment to said pouring compartment when the container is upright and preventing such flow when the container is tipped to pouring position.

8. In a liquid dispensing container, the combination of a substantially horizontal tubular member attached thereto in the upper portion of the side wall thereof, said tubular member having a cap at its outer end forming adjacent thereto a measuring compartment, a valve chamber partially closing the lower portion of the inner end of said tubular member, a pouring compartment arranged to receive liquid from said measuring compartment, a channel extending longitudinally through said valve chamber having a valve seat at its outer end, a valve within said chamber, and a valve retaining cap in the inner end of said channel and positioned to be removed through the top of said container.

9. In a liquid dispensing container the combination of a measuring compartment positioned near the top of said container, a pouring compartment arranged to receive liquid from said measuring compartment, said measuring compartment having an opening at the top thereof to receive liquid from said container when the container is tipped to pouring position, and a valve chamber for controlling the flow of said liquid to said pouring chamber comprising a horizontal cylindrical bore having a valve seat therein and an opening in the side thereof, and a ball valve within said bore and adapted to cooperate with said valve seat.

10. In a liquid dispensing container having an aperture in the upper portion of the side thereof, the combination of a pouring compartment and a measuring compartment arranged exteriorly of said container, said measuring compartment being mounted within said aperture in the side of said container, and means for attaching said pouring compartment to said measuring compartment.

11. In a liquid dispensing container having an aperture in the upper portion of the side wall thereof, a tubular member removably mounted in said aperture and containing a measuring compartment and valve chamber, and a pouring compartment positioned beneath said tubular member, said tubular member and said pouring compartment having an interlocking slidable connection therebetween for securing said pouring compartment in position.

LAWRENCE H. HYATT.